UNITED STATES PATENT OFFICE.

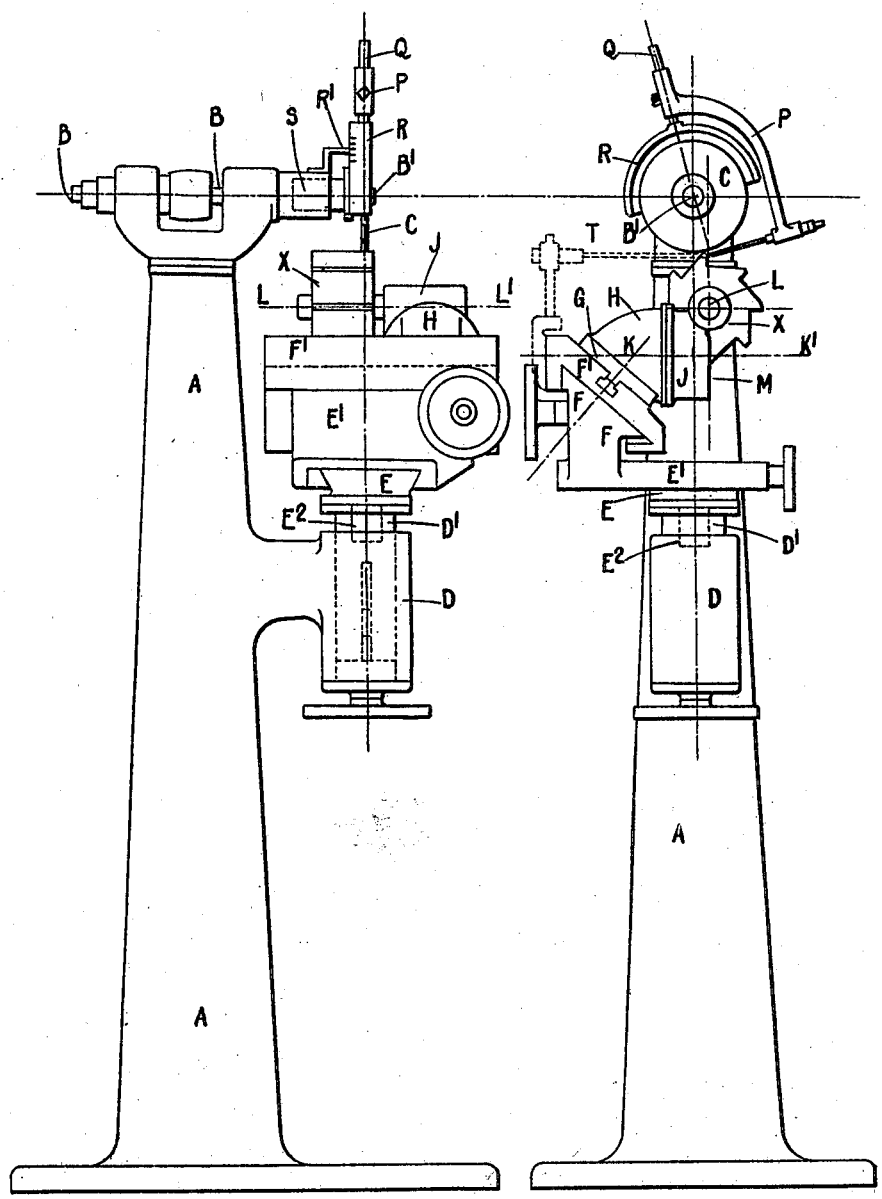

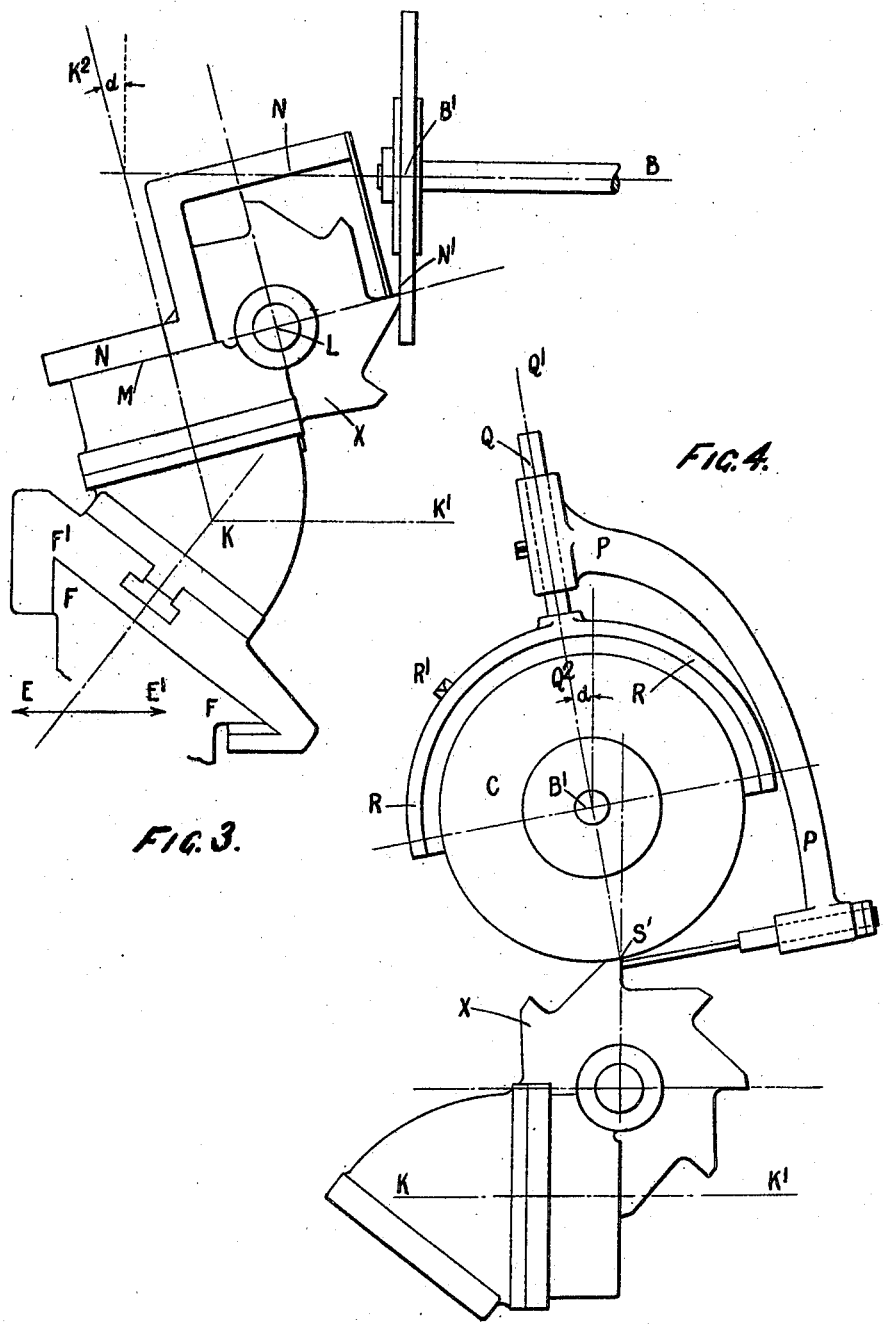

JAMES J. GUEST, OF LONDON, ENGLAND.

CUTTER-GRINDING MACHINE.

1,398,187.  Specification of Letters Patent.  Patented Nov. 22, 1921.

Application filed August 18, 1920. Serial No. 404,399.

*To all whom it may concern:*

Be it known that I, JAMES JOHN GUEST, a subject of the King of Great Britain and Ireland, residing at University College, Gower street, in the county of London, W. C., England, have invented certain new and useful Improvements in Cutter-Grinding Machines, of which the following is a specification.

This invention relates to machines for grinding or sharpening cutters such as reamers, milling cutters and like tools (hereinafter referred to as cutter grinding machines) and as for its object to provide improved means for enabling such operations to be effected in an expeditious and accurate manner.

In the improved machine constructed in accordance with this invention a frame carries the grinding wheel spindle, this frame being conveniently of the usual type, and upon this frame the following combination of slides is provided. A slide moving at right angles to the spindle carries a swivel the axis of rotation of which intersects the spindle near the center of the wheel. This swivel carries at right angles to its axis a guide upon which is mounted a cross slide. The main work or cutter slide is mounted in ways upon this slide to move in a direction at right angles to that of the cross-slide and to the axis of the swivel. A work or cutter head is mounted on the main slide and is capable of rotation about an axis parallel to the cross-slide, and the cutters to be ground are mounted on this head so that their axes are perpendicular to the axis of rotation of the head. The arrangement of parts is such that no part of the cutter head, shank or arbor comes in contact with the main slide and that the vertical plane in which the cutter axis lies normally passes through the center of the grinding wheel but is adjustable sidewise by means of the cross-slide to give the clearance.

The main and cross slides are so constructed that the cutter head can have two positions; one in which the axis of rotation of the cutter head is parallel to the wheel spindle when the main slide is perpendicular to the wheel spindle and the other in which the said axis is inclined to the wheel spindle at an angle differing from a right angle by the angle of clearance when the main slide is parallel to the wheel spindle.

In order accurately to set the work relatively to the grinding wheel I provide an improved gaging stop or tooth rest which is capable of three movements: one axially with respect to an axis intersecting the grinding wheel spindle at right angles; one rotationally about this axis; and one of angular adjustment of this axis about the grinding wheel spindle.

In the accompanying drawings which illustrate the manner in which my invention is carried into effect, Figures 1 and 2 represent in side and front elevation respectively, the improved cutter grinding machine.

Fig. 3 represents to enlarged scale the main and cross-slides in their alternative positions.

Fig. 4 represents to enlarged scale the construction of the tooth rest.

The machine body A, Figs. 1 and 2, carries a wheel spindle B B$^1$ with an abrasive wheel C, the spindle preferably being horizontal, and a slide D here shown as of the circular cylindrical type, whose line of motion is perpendicular to the axis of the wheel spindle B and preferably vertical, which directions are assumed in the description following. The second element D$^1$ of this slide D has the first element E of a second slide fitted to it so as to swivel about an axis parallel to the line of motion of the slide D, here shown as constructed by a neck E$^2$ on the part E being let into the circular part D$^1$. This axis of rotation is arranged to pass through the axis of the wheel spindle where the wheel C is carried. The line of motion of the second slide E—E$^1$ is perpendicular to this axis of rotational adjustment, and the second element E$^1$ of this slide, carries the main slide ways F set perpendicularly to the line of motion of the slide E—E$^1$ and to the axis of rotational adjustment. The main slide F$^1$ carries the mechanism for holding the cutter X to be ground mounted upon ways G which are inclined. The cutter head base H has the cutter head J fitted to it so as to swivel about an axis K—K$^1$ which, in its usual position, is parallel to the movement of the cross-slide E—E$^1$ as is shown in Fig. 2. The cutter head J holds cutters with their axis at right angles to this axis K—K$^1$ about which the cutter head swivels as is indicated by the cutter shown in the machine, whose axis is L—L$^1$, the cutter X being mounted on an arbor which fits the head as shown. This cutter axis is so far overhung from the main slide that the arbors or shanks are clear of the main slide in all positions of the head J on the base H, and hence the cutting edges can be freely presented to the wheel. This overhang is shown in Fig. 2. To hold reamers and like tools between centers the cutter head is replaced by a reamer head but the action is geometrically the same.

The ways G are symmetrical so that the cutter head base H may be reversed upon them, as is shown in Fig. 3. The ways shown consist of a flat surface with a T slot, into the narrow part of which projectors upon the cutter head base fit. In Fig. 3, the cross-slide E—E¹ and all above it have been swiveled about the vertical axis through a right angle, so that the line of motion of the cross-slide E—E¹ is now parallel to the wheel spindle B—B¹ and the main slide F—F¹ is perpendicular to it. The angles of the ways are so arranged that in this reversed position the axis of swiveling K—K² of the cutter head is inclined to the wheel spindle at an angle differing from a right angle by the angle of clearance.

The tooth rest N used is clamped to the surface M which is perpendicular to the axis K—K² and for convenience passes through the axis L of the cutter and the point N¹ of the tooth rest is set to be in this plane. Hence it so presents the tooth of any cutter, whether parallel, angular or face, that the face wheel used will grind the required clearance $\alpha$ upon it. In Fig. 3 a parallel cutter is shown in position for grinding. The amount of cut is adjusted by the use of the cross-slide E—E¹.

The setting for clearance in the usual position, which is that shown in Fig. 2, is accomplished as is shown in Fig. 4 in which a side mill is indicated. Use is made of a tooth rest P, carried conveniently on a stud Q, here shown as supported on the wheel guard R, the tooth rest being fitted to turn about and to slide along this stud, and to be capable of being clamped in any position. The axis Q¹ Q² of the stud which is the axis of the movements of the tooth rest P is made to pass through the wheel center B¹. The center P¹ of the end of the tooth rest blade is set so as to be upon this axis. The wheel guard R is fitted to swivel in a bearing S, Fig. 1, which is coaxial with the grinding wheel spindle B—B¹, and the amount of the angular setting of the wheel guard and therefore of the stud axis is shown by graduations against an index R¹. To produce an angle of clearance $\alpha$ the axis Q¹, Q², B¹ is set to make with the axis K—K¹ an angle differing from a right angle by the angle of the clearance. The point of the tooth rest is set close to the wheel and the cross-slide E—E¹ adjusted until the plane through the cutter axis perpendicular to the axis K—K¹ passes through P¹. This is most easily done by the use of the tooth rest N before mentioned or another tooth rest, indicated at T in Fig. 2 by dotted lines, and which fits to a surface on the main slide so that its point moves in this plane, so that it acts as a gage or as a tooth rest. Since in this position the angle between the tangent to the wheel, whatever be the wheel diameter, and the tangent to the cutter, at P¹, whether the cutter be face, angular or parallel, is the angle $\alpha$, this clearance will be produced upon the cutter.

If the teeth of the cutter be straight either one of the tooth rests N, T or P may be used. If the teeth are helical or spiral, the tooth rest P is used, and it is turned around the axis Q¹, Q² until the end of its blade is in proper contact with the teeth. As this adjustment of the tooth rest P around the stud does not alter the position of the center S' of the end of the blade, the grinding will produce the same clearance $\alpha$ upon the cutter.

I claim:—

1. In a cutter grinding machine a cutter spindle, a tooth rest carried upon an arm, and means for sliding said arm upon and rotating it about an axis which intersects at right angles the axis of rotation of the cutter spindle.

2. In a cutter grinding machine, a wheel spindle, a main slide, a cutter head mounted on said slide, a tooth rest, an arm carrying said tooth rest, means for adjusting said arm about an axis at right angles to said wheel spindle, means for adjusting said arm axially in respect to said axis and means for adjusting said arm by rotation about the axis of the wheel spindle.

3. In a cutter grinding machine a wheel spindle, a wheel guard, means for swiveling said guard about an axis coaxial with said spindle, a stud mounted on said guard with axis intersecting the wheel spindle axis at right angles, a tooth rest arm mounted upon said stud capable of axial and rotational movement thereon, a main slide, a cutter head carried on said slide, a cross slide upon which the main slide is mounted perpendicularly thereto.

4. In a cutter grinding machine a wheel spindle a main slide, a cutter head base, a cutter head, mounted to swivel upon the cutter head base, the cutter head base being mounted upon said main slide so as to be capable of having two positions in one of which the axis of the cutter head base about which the cutter head revolves is parallel to the main slide and in the other it makes with the axis of the wheel spindle an angle different from a right angle by the angle of clearance when the main slide is set perpendicularly to the wheel spindle.

5. In a cutter-grinding machine, the combination of a frame carrying a grinding wheel spindle; a slide having movement at right angles to the spindle; a swivel mounted upon the slide so that the axis of rotation intersects the wheel spindle at right angles near the center of the wheel; a cross slide mounted upon the swiveling element and set perpendicularly to its axis, a main slide carried upon the cross slide and perpendicular to it, and to the axis of rotation of the swivel, a cutter head carried on the main slide and rotatable about an axis parallel to the cross slide, and carrying the cutters to be ground so that their axes are perpendicular to the axis of rotation of the cutter head; the parts being so arranged that in the rotation of the cutter head no part of the cutter head, shank, or argor comes in contact with the main slide, and that the plane of rotation of the cutter axis normally passes through the center of the grinding wheel, but has, by means of the cross slide, sidewise adjustment for obtaining clearance.

In testimony whereof I affix my signature.

JAMES J. GUEST.